United States Patent
Wang et al.

(10) Patent No.: US 9,390,735 B1
(45) Date of Patent: Jul. 12, 2016

(54) DATA READER SIDE SHIELD WITH DIFFERING STRIPE HEIGHTS

(71) Applicant: Seagate Technology LLC, Cupertino, CA (US)

(72) Inventors: Zhiran Wang, Derry (GB); Kevin A. McNeill, Derry (GB); Robert Lamberton, Limavady (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/675,074

(22) Filed: Mar. 31, 2015

(51) Int. Cl.
*G11B 5/39* (2006.01)

(52) U.S. Cl.
CPC ............ *G11B 5/3912* (2013.01); *G11B 5/398* (2013.01)

(58) Field of Classification Search
CPC .. G11B 5/3912; G11B 5/3116; G11B 5/3932; G11B 2005/3996; G11B 5/11; G11B 5/398; G11B 5/313
USPC ...................................... 360/319, 324–324.2
See application file for complete search history.

(56) References Cited

U.S. PATENT DOCUMENTS

| | | | |
|---|---|---|---|
| 7,599,151 B2 * | 10/2009 | Hatatani | B82Y 10/00 360/123.12 |
| 7,869,165 B2 | 1/2011 | Miyauchi et al. | |
| 8,089,734 B2 * | 1/2012 | Miyauchi | B82Y 10/00 360/319 |
| 8,194,366 B1 | 6/2012 | Li et al. | |
| 8,369,048 B2 * | 2/2013 | Miyauchi | B82Y 10/00 360/319 |
| 8,400,738 B2 | 3/2013 | Covington et al. | |
| 8,437,106 B2 * | 5/2013 | Yanagisawa | B82Y 25/00 360/319 |
| 8,559,140 B2 | 10/2013 | Gao | |
| 8,630,068 B1 * | 1/2014 | Mauri | G11B 5/3909 360/319 |
| 8,749,926 B1 * | 6/2014 | Le | G11B 5/3909 360/319 |
| 8,792,208 B1 | 7/2014 | Liu et al. | |
| 8,842,396 B1 | 9/2014 | Zhu | |
| 8,854,773 B2 | 10/2014 | Sapozhnikov et al. | |
| 8,922,954 B2 * | 12/2014 | Cao | G11B 5/3163 360/324 |
| 8,976,493 B1 * | 3/2015 | Mashima | G11B 5/3163 360/324.11 |
| 9,076,468 B1 * | 7/2015 | Keener | G11B 5/3932 |
| 9,123,886 B2 * | 9/2015 | Zhang | H01L 43/12 |
| 9,190,082 B2 * | 11/2015 | Sapozhnikov | G11B 5/3951 |
| 2012/0087045 A1 * | 4/2012 | Yanagisawa | B82Y 25/00 360/294 |
| 2012/0087046 A1 * | 4/2012 | Yanagisawa | G01R 33/098 360/294 |
| 2014/0153138 A1 * | 6/2014 | Le | G11B 5/3909 360/294 |
| 2014/0252517 A1 * | 9/2014 | Zhang | G11B 5/3932 257/422 |
| 2015/0062755 A1 * | 3/2015 | Sapozhnikov | G11B 5/3951 360/235.4 |
| 2015/0092303 A1 * | 4/2015 | Aoyama | G11B 5/11 360/319 |
| 2015/0098155 A1 * | 4/2015 | Lapicki | G01R 33/093 360/319 |
| 2015/0248903 A1 * | 9/2015 | Aoyama | G11B 5/3912 360/99.08 |

* cited by examiner

*Primary Examiner* — Will J Klimowicz
(74) *Attorney, Agent, or Firm* — Hall Estill Attorneys at Law

(57) ABSTRACT

A data reader may have a magnetoresistive stack positioned on an air bearing surface and consisting of at least a magnetically free structure that continuously extends from the air bearing surface with a first stripe height. A side shield can be separated from the magnetoresistive stack on the ABS and configured with a first magnetic layer having the first stripe height and a second magnetic layer having a third stripe height from the air bearing surface with the third stripe height being greater than the first stripe height. The side shield can be anti-ferromagnetically biased by a synthetic antiferromagnetic top shield structure that contacts the side shield through a transition metal material layer. The first stripe height can be configured to match a magnetically free layer of the magnetoresistive stack and the second stripe height can be configured to match a magnetically fixed layer of the magnetoresistive stack.

18 Claims, 4 Drawing Sheets

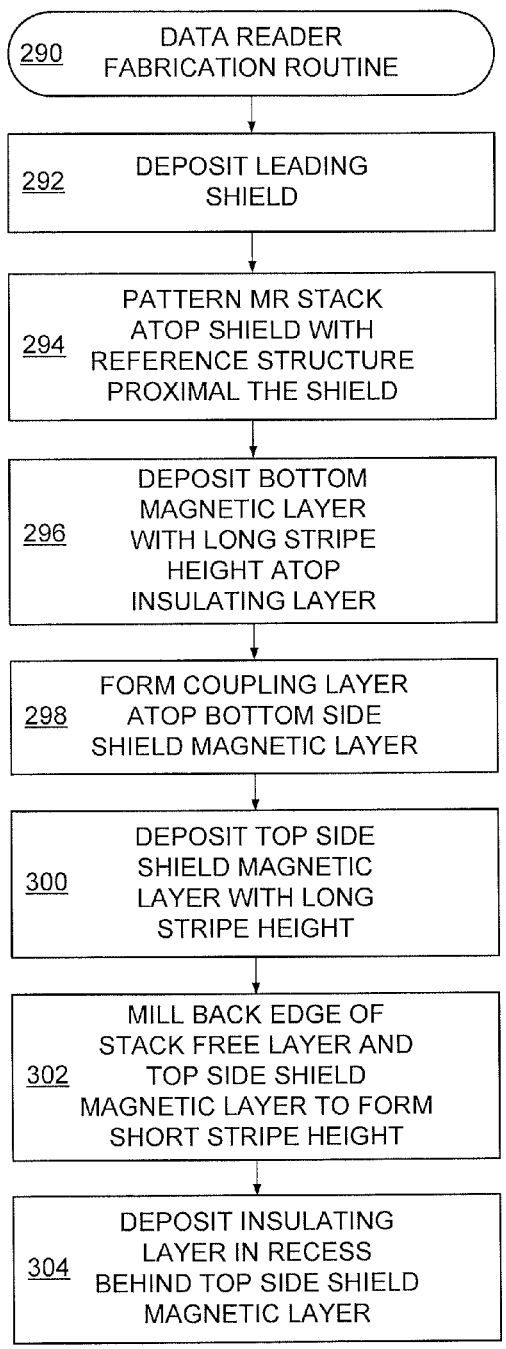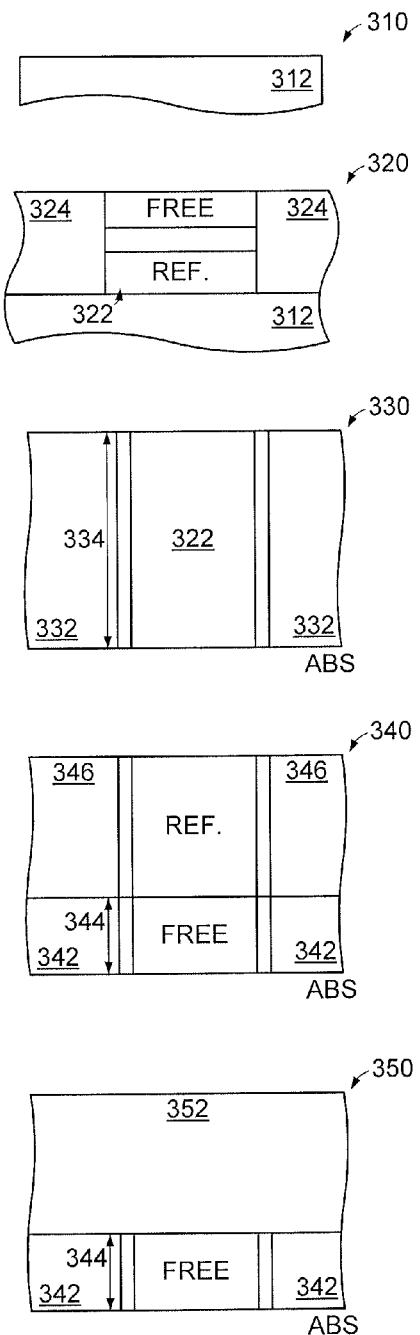
FIG. 6A
FIG. 6B

DATA READER SIDE SHIELD WITH DIFFERING STRIPE HEIGHTS

SUMMARY

In accordance with various embodiments, a data reader has a magnetoresistive stack positioned on an air bearing surface and consisting of at least a magnetically free structure that continuously extends from the air bearing surface with a first stripe height. A side shield is separated from the magnetoresistive stack on the ABS and has a first magnetic layer having the first stripe height and a second magnetic layer having a third stripe height from the air bearing surface with the third stripe height being greater than the first stripe height.

The side shield can be anti-ferromagnetically biased via contact with a transition metal layer and a synthetic antiferromagnetic top shield structure. The first stripe height can be configured to match a magnetically free layer of the magnetoresistive stack and the second stripe height can be configured to match a magnetically fixed layer of the magnetoresistive stack.

BRIEF DESCRIPTION OF THE DRAWINGS

FIGS. 6A & 6B respectively convey an example data reader fabrication routine carried out in accordance with various embodiments.

DETAILED DESCRIPTION

The performance of data reading components of a hard disk drive data storage device have been stressed by demand for increased data capacity and data access speeds. Reduction in the physical size of a data reader may yield increased data bit resolution, but may have losses in signal-to-noise ratio that correspond with increased magnetic volatility. While magnetic pinning structures can stabilize portions of a data reader, such structures often increase the physical size of the data reader, which reduces the reader's applicability to high data capacity hybrid and reduced form factor data storage devices. Hence, there is a continued interest in magnetic stabilization means that can reduce magnetic volatility without adding physical size to a data reader.

Accordingly, a data reader, in some embodiments, has a magnetoresistive stack positioned on an air bearing surface and consisting of at least a magnetically free structure that continuously extends from the air bearing surface (ABS) with a first stripe height and a side shield that is separated from the magnetoresistive stack on the ABS and has a first magnetic layer having the first stripe height and a second magnetic layer having a third stripe height from the air bearing surface with the third stripe height being greater than the first stripe height. The ability to tune the stripe heights of the first and second side shield magnetic layers allows for optimized biasing of the magnetoresistive stack and shielding of stray magnetic fields. The tuning of different side shield stripe heights can further allow greater signal-to-noise ratios (SNR) and reduced pulse width at 50% amplitude (PW50).

Figure 1:
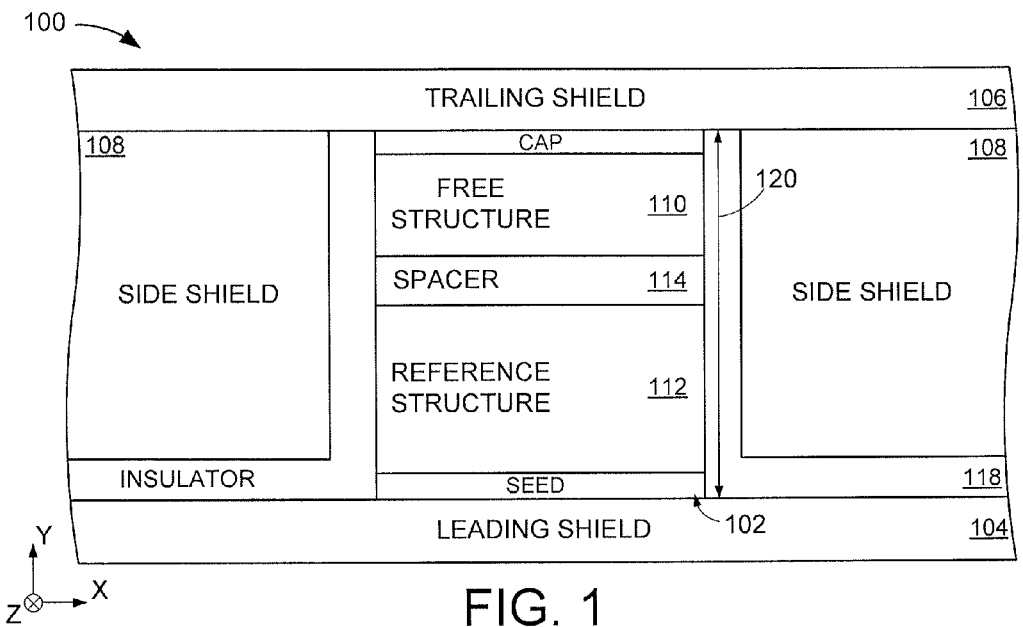
FIG. 1 displays a block representation of a portion of an example data reader arranged in accordance with various embodiments.

While a data reader employing a recessed pinning structure can be utilized in an unlimited variety of environments and systems, FIG. 1 provides block representation of a portion of an example data reader 100 that can be tuned and employed in a data storage system in accordance with various embodiments. The data reader 100 has a magnetoresistive (MR) stack 102 disposed vertically between leading 104 and trailing 106 shields and laterally between side shields 108. It is noted that the terms "leading" and "trailing" are not limiting and are meant to denote the shields position relative to data bits rotating on an adjacent data storage medium. It is also noted that the vertical direction is aligned with the Y axis and can be characterized as a downtrack direction that is perpendicular to the lateral direction that is aligned with the X axis and can be characterized as a crosstrack direction.

The MR stack 102 can be an unlimited variety of laminations that respond to discern between external data bits written as different magnetic polarities. In the non-limiting embodiment shown in FIG. 1, the MR stack 102 has a free structure 110 separated from a reference structure 112 by a non-magnetic spacer structure 114. The free structure 110 can be one or more magnetic and non-magnetic layers that are magnetically sensitive to external magnetic bits, despite having a default magnetization direction that may be set by one or more biasing elements in the data reader 100. The reference structure 112 can be configured as a lamination of magnetic and non-magnetic layers that provide a fixed magnetization that is not sensitive to encountered magnetic fields.

In various embodiments, the free structure 110 consists of a single magnetic layer while the reference structure 112 consists of a pinning layer, such as an antiferromagnetic material, and a reference layer, which may be a soft coercivity magnetic material like NiFe or CoFe alloys. It is contemplated that the MR stack 102 can be shaped in the X-Y plane on the ABS, such as in a trapezoidal or rhomboid shape, that can be defined by sidewalls that are angled with respect to the Y axis. The electrode cap and seed layers may be magnetic or non-magnetic and can be tuned to either couple or decouple portions of the MR stack 102 from the vertically disposed shields.

The MR stack 102 is separated from the side shields 108 by insulating layers 118 that can be tuned for shape and size to define the crosstrack data bit resolution of the data reader 100. It is contemplated that the free structure 110 is biased to a default magnetization by uniaxial anisotropy of the free structure layers and/or a hard magnetic coercivity biasing magnet positioned proximal the free structure 110. However, reducing the shield-to-shield spacing 120 (SSS) of the data reader 100 can correspond with data bit sensing performance difficulties associated with biasing the free structure 110 with a hard magnet or leaving the free structure 110 unbiased by a data reader magnet. Such data bit sensing difficulties can reduce SNR and PW50, which inhibit the data reader 100 from being employed in many data storage systems.

Figure 2:
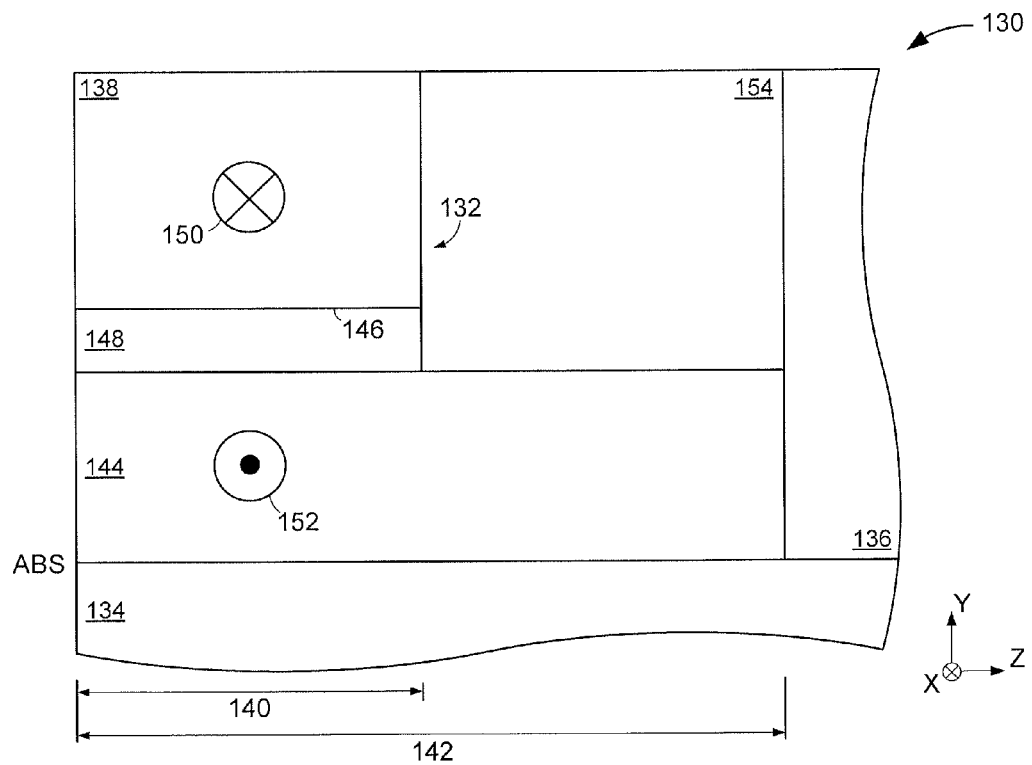
FIG. 2 shows an isometric view block representation of a portion of an example data reader configured in accordance with some embodiments.

With these difficulties in mind, at least one side shield 108 can be configured to bias the free structure 110 and shield stray magnetic fields while increasing SNR and PW50. FIG. 2 illustrates an isometric block representation of a portion of an example data reader 130 arranged in accordance with some embodiments to provide optimized data bit sensing. A side shield 132 is positioned in contact with a leading shield 134 and with insulating materials 136 that can separate the side shield 132 from direct contact with an MR stack. In some embodiments, an MR stack positioned adjacent to the side shield 132 on the ABS is configured as a spin valve with magnetically free and magnetically fixed structures separated by a non-magnetic spacer.

With the SSS of the MR stack being reduced to increase data bit resolution, the physical size of the various magnetic and non-magnetic layers of the MR stack decrease, which can result in volatile magnetic behavior and inaccurate sensing of data bits, particularly data bit arranged in high areal densities on a data storage medium. The biasing of a free structure of the MR stack with a first magnetic layer 138 of the side shield 132 can stabilize the magnetic volatility of the MR stack and optimize the data sensing of the data reader 130 in a reduced SSS form factor. However, simply magnetizing the first magnetic layer 138 can result in inadvertent MR stack free structure magnetic stiffness and/or diminished side shield 132 shielding capabilities due to the physical size and magnetization generation in the side shield 132.

Accordingly, various embodiments tune the first magnetic layer 138 with a stripe height 140 that is smaller than the stripe height 142 of the second side shield magnetic layer 144. The first stripe height 140 of the first magnetic layer 138 can match the stripe height of the magnetically free structure of the MR stack. In some embodiments, the first magnetic layer 138 is laterally aligned with the free structure of the MR stack, as defined by the X axis and the uniaxial seam 146, which allows the magnetization of the first magnetic layer 138 to bias the free structure with optimal strength that provides a default magnetization without unduly increasing free structure magnetic stiffness. The smaller stripe height 140 of the first magnetic layer 138 is complemented by the larger stripe height 142 of the second magnetic layer 144 that has a magnetization 152 that provides optimized shielding of stray magnetic fields.

Although not limiting, a non-magnetic coupling layer 148 is positioned between the first 138 and second 144 magnetic layers to provide Ruderman-Kittel-Kasuya-Yoshida (RKKY) exchange coupling in the side shield 132 that sets the respective magnetizations 150 and 152 that have tuned strength and orientation to provide optimal biasing and shielding characteristics for the data reader 130. The coupling layer 148 may be configured with any material, thickness along the Y axis, and stripe height from the ABS to further tune the RKKY coupling in the side shield 132. A non-magnetic isolation layer 154 can be positioned in contact with the first 138 and second 144 magnetic layers as well as the coupling layer 148 to magnetically retain the side shield magnetizations 150 and 152 proximal the respective portions of the side shield 132.

Figure 3A:
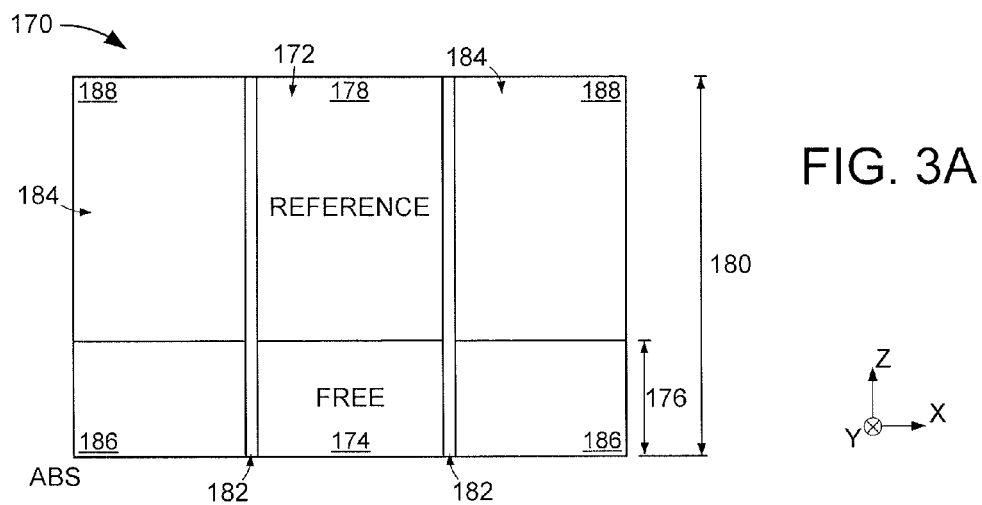
FIGS. 3A-3C respectively provide various views of a portion of an example data reader arranged in accordance with various embodiments.
Figure 3B:
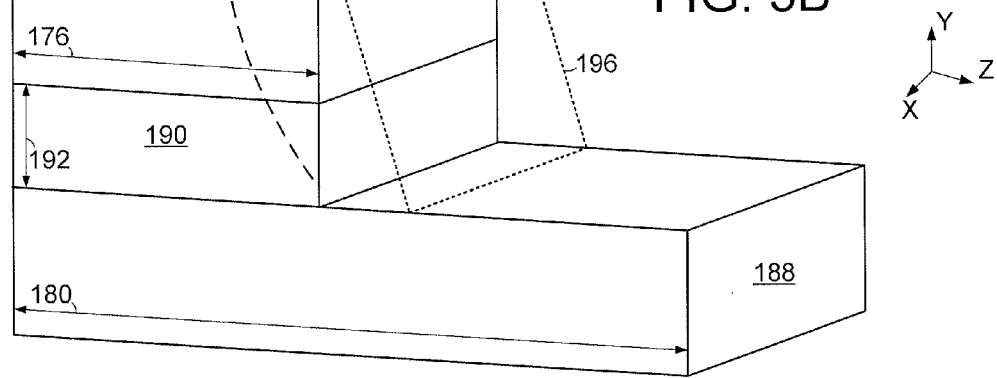
Figure 3C:
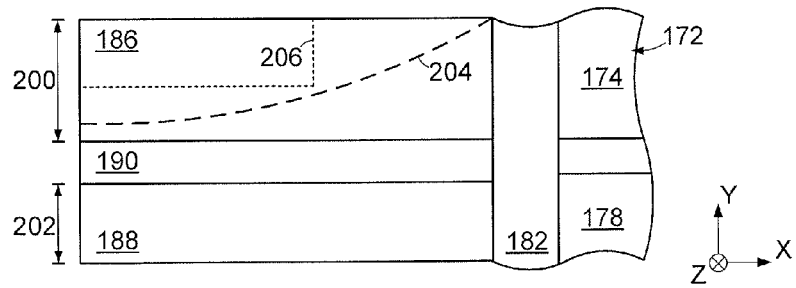

FIGS. 3A-3C respectively various block representations of portions of an example data reader 170 configured for optimized data sensing performance. FIG. 3A shows how an MR stack 172 can have a free structure 174 with a first stripe height 176 and a reference structure 178 with a greater second stripe height 180. The larger stripe height 180 of the reference structure 178 may allow for increased robustness that counteracts its relatively small physical area on the ABS to provide a fixed magnetization that is not sensitive to encountered data bits and stray magnetic fields.

The MR stack 172 is disposed between insulating layers 182 that physically separate the side shields 184 from the free 174 and reference 178 structures. The size and shape of the insulating layers 182 tune a first side shield magnetic layer 186 to magnetically bias the free structure 174. Tuning the first side shield magnetic layer 186 to continuously extend to the first stripe height 176 to match the free structure 174 can increase the efficiency of biasing without raising free structure 174 magnetic stiffness. By tuning the second side shield magnetic layer 188 to have the same stripe height 180 as the reference structure 178, each side shield 184 can provide a combination of biasing with the first magnetic layer 186 and shielding with the second magnetic layer 188.

As shown in FIG. 3B, a coupling layer 190 is disposed between the first 186 and second 188 magnetic layers of the side shield 184. The coupling layer 190 may be constructed as a single layer of a non-magnetic material or as a lamination of different magnetic and non-magnetic layers. The construction of the coupling layer 190 may further be tuned for thickness 192 along the Y axis, parallel to the ABS and to a longitudinal axis extending downtrack. The tuned configuration of the coupling layer 190 can complement the different magnetic layer stripe heights 186 and 188 by providing RKKY exchange coupling in the side shield 184 that can result in greater signal amplitude.

Although any portion of the side shield 184 can have a rectangular shape defined by multiple pairs of parallel edges, the isometric view of FIG. 3B illustrates several non-limiting embodiments where a back edge 194 of the first magnetic 186 and coupling 190 layers is shaped to be non-rectangular with respect to the Y-Z plane, perpendicular to the ABS. The back edge 194 is distal the ABS and may be shaped with a continuously linear surface 196, a continuously curvilinear surface 198, or combinations thereof. The shaped back edge 192 configurations can be tuned to customize the size and magnetization of the first magnetic layer 186 as well as the coupling provided by the coupling layer 190.

Customizing the magnetic characteristics of the side shield 184 is not limited to the rear edge surface 192. The second magnetic layer 188 may also have a shaped rear surface that is distal the ABS. FIG. 3C provides an ABS view of the data reader 170 where the side shield 184 that is customized to provide optimized free structure 174 biasing and MR stack 172 shielding. The first magnetic layer 186 can be tuned with a uniform thickness 200 that matches or is different than a uniform thickness 202 of the second magnetic layer 188. The tuned thicknesses of the magnetic layers 186 and 188 can customize the position and magnetic strength of magnetizations present in the side shield 184.

The magnetic layers 186 and 188 are not limited to uniform thicknesses on the ABS. In various embodiments, the first 186 and/or second 188 magnetic layers are tuned to a varying thickness configuration along the X-Y plane, parallel to the ABS. Segmented line 204 illustrates how a continuously curvilinear surface can vary the thickness 200 of the magnetic layer 186 so that the layer has a greater surface area proximal the MR stack 172 compared to distal the MR stack 172 on the ABS. Segmented line 206 represents another non-limiting example of how the thickness 200 of the first magnetic layer 186 can vary through the incorporation of a rectangular notch that can be filled with magnetic or non-magnetic material to tune the biasing characteristics of the first magnetic layer 186. The ability to configure the first 186 and/or second 188 magnetic layers with varying thicknesses 200 and 202 as well as with different materials allows the shielding and biasing characteristics of the side shield 184 to be catered to a diverse variety of data storage environments.

Figure 4:
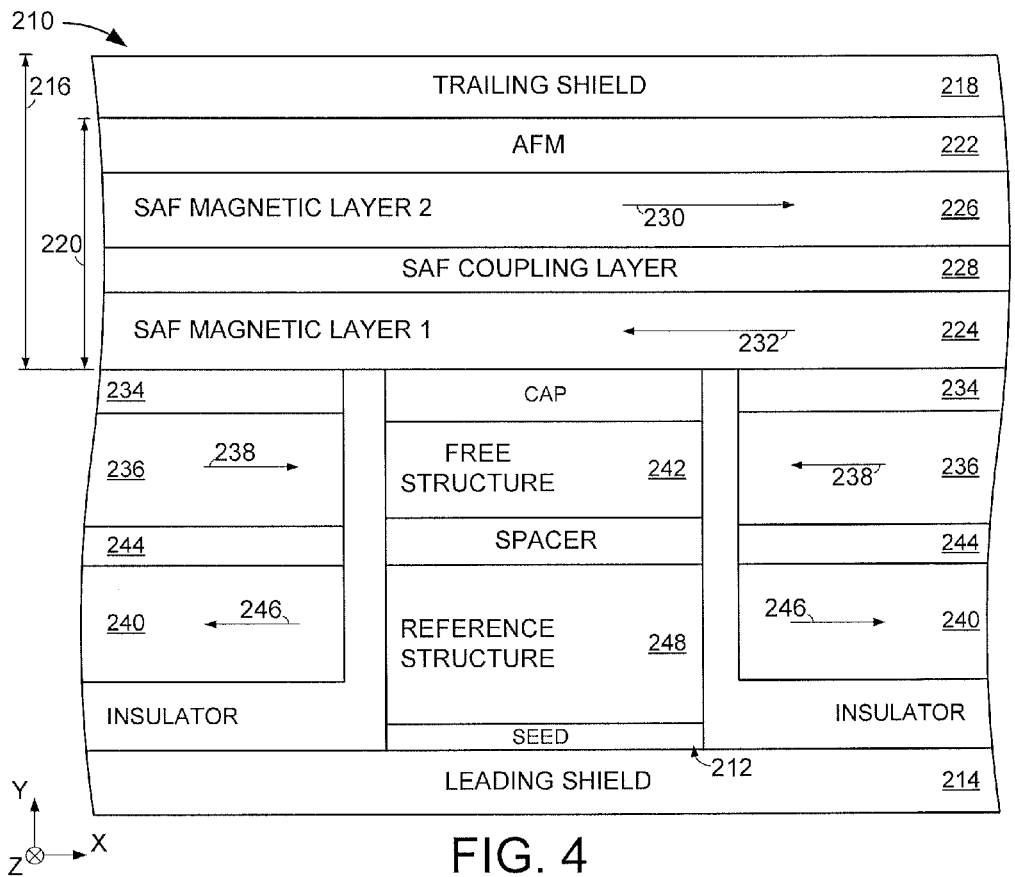
FIG. 4 is an ABS view block representation of a portion of an example data reader arranged in accordance with assorted embodiments.

The tuned material, size, and shape of the various aspects of the side shield 184 can correspond with a magnetization source that provides magnetization to the side shield 184 without inducing magnetic volatility in the data reader 170. FIG. 4 is a block representation of a portion of an example data reader 210 constructed and operated in accordance with some embodiments to provide stable data sensing performance. The data reader 210 has an MR stack 212 contactingly disposed between leading 214 and trailing 216 magnetic shields. Although the leading shield 214 can be configured as a lamination of multiple magnetic and non-magnetic materials, the non-limiting embodiment shown in FIG. 4 configures the trailing shield 216 with a shield layer 218 and a magnetization generator 220 consisting of an antiferromagnet (AFM) 222 pinning a synthetic antiferromagnet (SAF) structure.

The SAF structure has first 224 and second 226 magnetic layers separated by a non-magnetic SAF coupling layer 228 that provides antiferromagnetic coupling that results in magnetizations 230 and 232 facing opposite directions, which can be characterized as an antiparallel orientation. The SAF coupling layer 228 can be tuned for thickness to adjust the strength of the respective magnetizations 230 and 232. A shield coupling layer 234 can be constructed of a transition metal material, such as Ru, and disposed between the trailing shield 216 and first shield magnetic layer 236. The tuned configuration of the shield coupling layer 234 can exchange couple the magnetization 232 of the first SAF magnetic layer 224 to the first shield magnetic layer 236, as indicated by the parallel magnetic orientation of magnetizations 232 and 238.

The coupled configuration of the biasing magnetization 238 of the first shield magnetic layer 236 with the trailing shield 216 can provide increased stability and robustness in view of encountered magnetic fields. Meanwhile, the tuned stripe height of the first shield magnetic layer 236 compared to the second shield magnetic layer 240 ensures the bias magnetization 238 is not too strong to stiffen the free structure 242 of the MR stack 212. The tuned configuration of the second shield magnetic layer 240 in combination with the non-magnetic shield coupling layer 244 provides a shielding magnetization 246 that dynamically balances the biasing magnetization 238 in view of encountered magnetic fields to consistently provide optimized bias force on the free structure 242 while increasing reader signal by maximizing the force and efficiency of the reference structure 248.

Figure 5:
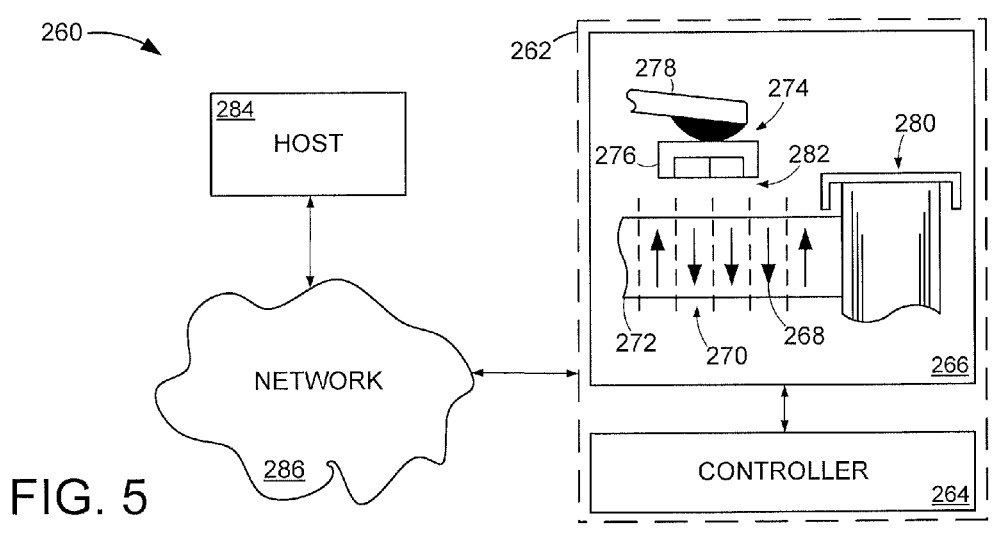
FIG. 5 is a block representation of an example data storage system configured and operated in accordance with some embodiments.

FIG. 5 displays a block representation of a portion of an example data storage system 260 in which a tuned data reader can be commissioned in accordance with some embodiments. Although not required or limiting, the data storage system 260 can have one or more data storage devices 262 that are configured with at least one data storage means. It is contemplated that various solid-state volatile and non-volatile memories can be used as data storage means.

Assorted embodiments arrange at least one data storage device 262 of the data storage system 260 as a hard disk drive with at least one local controller 264 directing operations of a transducing assembly 266 that consists of a plurality of data bits 268 stored in various data track 270 portions of a data storage medium 272. One or more data bits 268 can be accessed individually, concurrently, and successively by a read head 274 that has a slider 276 suspended from an actuating assembly 278 to present data reader and data writer components. In operation, a spindle 280 can rotate the data storage medium 272 to produce an air bearing 282 on which the slider 276 flies, as directed by the actuating assembly 278 and controller 264.

While the data storage device 262 can operate solely with the local controller 264, various embodiments connect the data storage device 262 with at least one remote host 284 via a wired and/or wireless network 286. The remote connection of the data storage device 262 allows the remote host 284 to provide additional processing, data storage, and security capabilities without impinging on the operation of the data storage device 262. It is contemplated that the data storage system 260 can incorporated any number of data readers that are arranged to provide optimized side shield data reader biasing and shielding structures.

Although not required or limiting, FIGS. 6A & 6B convey an example data reader fabrication routine 290 carried out in accordance with various embodiments to construct a data reader tuned to a predetermined data storage environment. The routine 290 begins by depositing a leading shield onto a substrate in step 292. The leading shield can be tuned for thickness, material, and magnetic characteristics, such as magnetic moment and uniaxial anisotropy, as illustrated by reader 310 and shield 312 of FIG. 6B.

Next, step 294 patterns an MR stack onto the leading shield with a long stripe height and a reference structure portion of the MR stack positioned proximal the leading shield. Reader 320 shows how a magnetic stack 322 can be disposed between patterning material 324. It is noted that step 294 can construct any number of magnetic and non-magnetic layers to provide any type of magnetoresistive element, such as spin valve, lateral spin valve, and abutted junction reader elements. The patterning material 324 is subsequently removed as step 296 deposits a bottom side shield magnetic layer atop an insulating layer. The bottom side shield magnetic layer can be tuned for shape, thickness, material, and stripe height to provide dynamic shielding. For example, the bottom magnetic layer may be constructed via oblique incidence sputtering to provide a predetermined lattice structure, magnetic moment, and uniaxial anisotropy.

Reader 330 illustrates how step 296 can result in a bottom side shield magnetic layer 332 with a long stripe height, such as 245 nm, that matches the long stripe height of the MR stack 322. Step 298 then forms a non-magnetic shield coupling layer on the bottom side shield magnetic layer with the long stripe height. A top side shield magnetic layer is then deposited in step 300 with the long stripe height atop the coupling layer. The top side shield magnetic layer can be tuned similarly or dissimilarly to the bottom side shield magnetic layer to provide optimized biasing and shielding capabilities. For example, the top side shield magnetic layer may be formed with oblique incidence sputtering that differs from the process used to form the bottom side shield magnetic layer that results in different magnetic moments and uniaxial anisotropies in the side shield magnetic layers, which may be complemented by configuring the layers of similar or dissimilar materials.

With all the layers of the data reader having the long stripe height at the end of step 300, step 302 proceeds to mill at least the back edge portion of the top side shield magnetic layer to a predetermined shape, such as the rectangular, linear, or curvilinear shapes shown in FIG. 3B. Reader 340 is a top view of the result of step 302 where the top side shield magnetic layer 342, free structure, and coupling layer each have a reduced stripe height 344, such as 30 nm, compared to the long stripe height 334 of the bottom side shield magnetic layer 346 and reference structure. It is contemplated that step 302 can remove portions of the reference structure and bottom side shield magnetic layer to provide multiple different stripe heights between the MR stack and the side shields.

Construction of the differing stripe heights in step 302 allows step 304 to subsequently deposit one or more insulating layers atop the side shield layers, as illustrated in reader 350. The insulating materials deposited in step 304 may be similar or dissimilar to the insulating material laterally separating the side shields from the MR stack. The insulating material 352 can continuously extend across the MR stack, distal the ABS, to magnetically isolate the extended portions of the reference structure and bottom side shield magnetic layer from the free structure and top side shield magnetic layer. It is noted that the various aspects of routine 290 can be changed and removed at will just as additional steps and decisions can be added. For instance, additional steps can construct a biasing trailing shield by successively forming shield coupling layers, SAF, AFM, and soft magnetic structures.

Through the various tuned side shield configurations, an MR stack can experience optimized reader performance associated with decreased magnetic volatility and consistent free structure biasing. The ability to tune the stripe heights of the side shield magnetic layers allows for ample biasing magnetization proximal the magnetically free portion of the MR stack along with dynamic shielding magnetization proximal the magnetically fixed portion of the MR stack. The combination of optimized magnetic shielding and biasing can increase SNR and data sensing signal amplitude without adding to the SSS of the data reader, which allows the reader to be utilized in high data bit density data storage environments.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising:
   a magnetoresistive (MR) stack positioned on an air bearing surface (ABS) and comprising a free structure extending a first stripe height from the ABS; and
   a side shield separated from the MR stack on the ABS and comprising a first magnetic layer having the first stripe height, a second magnetic layer having a second stripe height from the ABS, and a non-magnetic layer having a third stripe height from the ABS, the second and third stripe heights each being greater than the first stripe height, wherein the non-magnetic layer is disposed between the first and second magnetic layers.

2. The apparatus of claim 1, wherein the MR stack comprises a reference structure separated from the free structure by a non-magnetic spacer.

3. The apparatus of claim 1, wherein the non-magnetic layer has a varying thickness along the third stripe height, the thickness measured parallel to the ABS.

4. The apparatus of claim 1, wherein the first and second magnetic layers have different thicknesses on the ABS, the thicknesses each measured parallel to the ABS.

5. The apparatus of claim 1, wherein the second and third stripe heights are different.

6. The apparatus of claim 1, wherein the first magnetic layer has a rear surface separated from the ABS and having a curvilinear shape.

7. The apparatus of claim 6, wherein the rear surface is angled to present a greater thickness proximal the MR stack than distal the MR stack, the thickness measured parallel to the ABS and parallel to a longitudinal axis of the MR stack.

8. The apparatus of claim 1, wherein the first magnetic layer is aligned with the free structure along a cross-track direction, the cross-track direction parallel to the ABS.

9. A data reader comprising:
   a magnetoresistive (MR) stack positioned on an air bearing surface (ABS) and comprising a free structure extending a first stripe height from the ABS and a reference structure extending a second stripe height from the ABS, the first and second stripe heights being different; and
   a side shield separated from the MR stack on the ABS and comprising first and second magnetic layers, the first magnetic layer extending the first stripe height from the ABS and configured with a rear surface separated from the ABS and oriented at a non-zero angle with respect to the ABS to bias the free structure to a default magnetization, the second magnetic layer positioned proximal the reference structure and extending a third stripe height from the ABS, the third stripe height being greater than the first stripe height.

10. The data reader of claim 9, wherein the first magnetic layer is coupled to a top shield via a coupling layer disposed between the first magnetic layer and the top shield.

11. The data reader of claim 10, wherein the first magnetic layer is coupled to a synthetic antiferromagnet (SAF) portion of the top shield.

12. The data reader of claim 10, wherein the first magnetic layer has a first magnetization orientation that is antiparallel to both a second magnetization orientation of the second magnetic layer and a third magnetization orientation of the top shield.

13. The data reader of claim 9, wherein the first and second magnetic layers are Ruderman-Kittel-Kasuya-Yoshida (RKKY) exchange coupled.

14. A method comprising:
   positioning a magnetoresistive (MR) stack on an air bearing surface (ABS) and comprising a free structure extending a first stripe height from the ABS; and
   constructing a side shield with a first magnetic layer, second magnetic layer, and a non-magnetic layer, the side shield separated from the MR stack on the ABS, the first magnetic layer having the first stripe height from the ABS, the second magnetic layer having a second stripe height from the ABS, the non-magnetic layer having a third stripe height from the ABS, the second and third stripe heights each being greater than the first stripe height, wherein the non-magnetic layer of the side shield is disposed between the first and second magnetic layers.

15. The method of claim 14, wherein the first magnetic layer biases the free structure to a default magnetization and the second magnetic layer shields the MR stack from external magnetic fields.

16. The method of claim 14, wherein the first magnetic layer is constructed via sputtering with a first oblique incidence angle that provides a first uniaxial anisotropy.

17. The method of claim 16, wherein the second magnetic layer is constructed via sputtering with a second oblique incidence angle that provides a second uniaxial anisotropy, the first and second oblique incidence angles and uniaxial anisotropies respectively being different.

18. The method of claim 14, wherein, the non-magnetic layer having a roughness that provides a lattice structure and magnetic moment that differs from the second magnetic layer.

* * * * *